United States Patent
Zhu et al.

(10) Patent No.: US 12,460,621 B1
(45) Date of Patent: Nov. 4, 2025

(54) MULTI-BLADE WIND TURBINE

(71) Applicants: HUANENG SHANXI COMPREHENSIVE ENERGY CO., LTD., Taiyuan (CN); HUANENG YUSHE POVERTY ALLEVIATION ENERGY CO., LTD., Jinzhong (CN); HUANENG SHANXI COMPREHENSIVE ENERGY CO., LTD. YUSHE PHOTOVOLTAIC POWER STATION, Jinzhong (CN); LICHENG YINGHENG CLEAN ENERGY CO., LTD., Changzhi (CN); HUANENG RUICHENG COMPREHENSIVE ENERGY CO., LTD., Yuncheng (CN); HUANENG ZUOQUAN YANGJIAO WIND POWER CO., LTD., Jinzhong (CN); RUICHENG NINGSHENG NEW ENERGY CO., LTD., Yuncheng (CN); WUZHAI TAIZHONG NEW ENERGY WIND POWER GENERATION CO., LTD., Xinzhou (CN); SHUOZHOU TAIZHONG WIND POWER GENERATION CO., LTD., Shuozhou (CN)

(72) Inventors: Zhuanghua Zhu, Taiyuan (CN); Yamin Chang, Taiyuan (CN); Yong Chen, Taiyuan (CN); Xuefeng Shi, Taiyuan (CN); Zhihong Liu, Taiyuan (CN); Zhizhong Peng, Taiyuan (CN); Jianhua Liu, Taiyuan (CN); Yanjun Chen, Taiyuan (CN); Jiyong Zhao, Taiyuan (CN)

(73) Assignees: Huaneng Shanxi Comprehensive Energy Co., Ltd., Taiyuan (CN); Huaneng Yushe Poverty Alleviation Energy Co., Ltd., Jinzhong (CN); Huaneng Shanxi Comprehensive Energy Co., Ltd., Jinzhong (CN); Licheng Yingheng Clean Energy Co., Ltd., Changzhi (CN); Huaneng Ruicheng Comprehensive Energy Co., Ltd., Yuncheng (CN); Huaneng Zuoquan Yangjiao Wind Power Co., Ltd., Jinzhong (CN); Ruicheng Ningsheng New Energy Co., Ltd., Yuncheng (CN); Wuzhai Taizhong New Energy Wind Power Generation Co., Ltd., Xinzhou (CN); Shuozhou Taizhong Wind Power Generation Co., Ltd., Shuozhou (CN)

( * ) Notice: Subject to any disclaimer, the term of this patent is extended or adjusted under 35 U.S.C. 154(b) by 0 days.

(21) Appl. No.: 18/955,849

(22) Filed: Nov. 21, 2024

Related U.S. Application Data

(63) Continuation of application No. PCT/CN2024/117124, filed on Sep. 5, 2024.

(51) Int. Cl.
*F03D 15/00* (2016.01)
*H02K 5/20* (2006.01)
(Continued)

(52) U.S. Cl.
CPC ............ *F03D 15/00* (2016.05); *H02K 5/207* (2021.01); *H02K 7/116* (2013.01); *H02K 7/1838* (2013.01);
(Continued)

(58) Field of Classification Search
CPC ........ F03D 15/00; H02K 5/207; H02K 7/116; H02K 7/1838; H02K 2205/09; F05B 2260/231; F05B 2260/4031
See application file for complete search history.

(56) References Cited

U.S. PATENT DOCUMENTS 2,360,792 A * 10/1944 Putnam ................. F03D 7/0224
416/157 R
4,495,423 A * 1/1985 Rogers ................. F03D 7/0224
290/55
(Continued)

FOREIGN PATENT DOCUMENTS

| CN | 1844660 A | 10/2006 |
|---|---|---|
| CN | 102434390 A | 5/2012 |

(Continued)

OTHER PUBLICATIONS

Xinjia Yao, Shirong Wang, Liping Dong, Wind Power Technology Seminar (4)—Wind Turbine (2), Database, Aug. 25, 2006 D4 Renewable Energy, China.

*Primary Examiner* — Tulsidas C Patel
*Assistant Examiner* — Thomas K Quigley
(74) *Attorney, Agent, or Firm* — Ming Jiang; OPENPTO US LLC

(57) ABSTRACT

Provided are a multi-blade wind generator. The multi-blade wind generator relates to the technical field of wind power
(Continued)

generation, and includes a bottom plate, where a bracket is installed at an upper end of the bottom plate, a working housing is installed at an upper end of the bracket, and a generator is arranged in a first working cavity inside the working housing, and a motor shaft of the generator is connected with a first rotating shaft through a speed-increasing and heat-dissipating mechanism; the first rotating shaft penetrates a front end of the working housing and is fixedly connected with a rotating drum, and the working housing is rotatably connected with the rotating drum, and a cavity is arranged in the rotating drum, and a motor is fixedly arranged in the cavity in the rotating drum, and the motor is fixedly connected with a first bevel gear.

3 Claims, 4 Drawing Sheets

(51) Int. Cl.
*H02K 7/116* (2006.01)
*H02K 7/18* (2006.01)

(52) U.S. Cl.
CPC . *F05B 2260/231* (2013.01); *F05B 2260/4031* (2013.01); *H02K 2205/09* (2013.01)

(56) References Cited

U.S. PATENT DOCUMENTS

| | | | | |
|---|---|---|---|---|
| 5,876,181 A * | 3/1999 | Shin | | F03D 15/10 |
| | | | | 416/111 |
| 2011/0206516 A1 | 8/2011 | Henriksen | | |
| 2012/0292065 A1 * | 11/2012 | Hoshi | | B25B 21/02 |
| | | | | 173/93 |
| 2014/0064963 A1 * | 3/2014 | Tobinaga | | F03D 80/00 |
| | | | | 416/9 |
| 2014/0217731 A1 * | 8/2014 | Arinaga | | F03D 7/0284 |
| | | | | 290/44 |
| 2014/0241879 A1 | 8/2014 | Fahrner | | |
| 2014/0341740 A1 * | 11/2014 | Pasquet | | F03D 80/70 |
| | | | | 416/155 |
| 2014/0361547 A1 * | 12/2014 | Alti Barbon | | F03D 9/25 |
| | | | | 290/55 |
| 2015/0016998 A1 * | 1/2015 | Pasquet | | F03D 80/70 |
| | | | | 416/147 |
| 2018/0142408 A1 * | 5/2018 | Ahn | | D06F 58/46 |
| 2019/0144110 A1 | 5/2019 | Bogrash | | |
| 2020/0025278 A1 * | 1/2020 | Lundbäck | | F03D 15/00 |
| 2021/0016864 A1 * | 1/2021 | McBain | | B64C 11/34 |
| 2021/0115906 A1 * | 4/2021 | Nies | | F16H 57/045 |
| 2022/0209604 A1 * | 6/2022 | Cross | | H02K 15/06 |
| 2024/0271598 A1 * | 8/2024 | Medina Diaz | | F03D 7/0248 |

FOREIGN PATENT DOCUMENTS

| | | |
|---|---|---|
| CN | 102606406 A | 7/2012 |
| CN | 202370747 U | 8/2012 |
| CN | 206860376 U | 1/2018 |
| CN | 207974919 U | 10/2018 |
| CN | 209293963 U | 8/2019 |
| CN | 211819798 U | 10/2020 |
| CN | 112196738 A | 1/2021 |
| CN | 113090479 A | 7/2021 |
| CN | 114562415 A | 5/2022 |
| CN | 115441641 A | 12/2022 |
| CN | 219344877 U | 7/2023 |
| DE | 3117996 A1 | 11/1982 |
| JP | 2001099045 A | 4/2001 |
| JP | 2014214679 A | 11/2014 |
| KR | 101379455 B1 | 3/2014 |
| KR | 101723175 B1 | 4/2017 |

\* cited by examiner

MULTI-BLADE WIND TURBINE

CROSS-REFERENCE TO RELATED APPLICATIONS

This application is a continuation of PCT/CN2024/117124, filed Sep. 5, 2024 and claims priority of Chinese Patent Application No. 202311204725.8, filed on Sep. 19, 2023, the contents of which are hereby incorporated by reference.

TECHNICAL FIELD

The disclosure relates to the technical field of wind power generation, in particular to a multi-blade wind turbine.

BACKGROUND

The principle of wind power generation is to use wind power to drive the windmill blades to rotate, and then the rotating speed is increased by the speed increaser to promote the generator to generate electricity. At present, most of the wind energy conversion systems adopt horizontal shaft wind generators, that is, three blades are installed on the horizontal shaft, and the wind force and the windward side inclination of the blades generate thrust to drive the generator to rotate to realize power generation.

When the wind is strong, the acting force acting on the blades increases, so that the rotating speed of the blades increases, and the input power of the generator will increase, and the output voltage and frequency will increase. However, when the wind level is too high, the rotating speed of the motor shaft of the generator will be too fast, which will seriously affect the service life of the generator. In the process of wind power generation, the generator will generate a lot of heat, if the generator is not cooled, it will affect the normal operation and even the service life of the generator.

SUMMARY

The disclosure provides a multi-blade wind generator, which is used to solve at least one of the technical problems mentioned above that when the wind power level is too high, the rotating speed of the motor shaft of the generator will be too fast, which will seriously affect the service life of the generator, and in the process of wind power generation, the generator will generate a lot of heat, and if the generator is not cooled, it will affect the normal operation and even the service life of the generator.

In order to solve the above technical problems, a multi-blade wind turbine is provided and includes a bottom plate, a bracket is installed at an upper end of the bottom plate, a working housing is installed at an upper end of the bracket, and a generator is arranged in a first working cavity inside the working housing, and a motor shaft of the generator is connected with a first rotating shaft through a speed-increasing and heat-dissipating mechanism; the first rotating shaft penetrates a front end of the working housing and is fixedly connected with a rotating drum, and the rotating drum is configured for rotation relative to the working housing, and a cavity is arranged in the rotating drum, and a motor is fixedly arranged in the cavity in the rotating drum, and the motor is fixedly connected with a first bevel gear; the first bevel gear is evenly meshed with a plurality of second bevel gears in a circumferential direction, and the plurality of second bevel gears are fixedly connected with a plurality of fixed shafts in one-to-one correspondence, and each of the fixed shafts penetrates a side wall of the rotating drum at a different position on the side wall and is fixedly connected with a respective blade.

Preferably, the generator is fixedly connected with a first mounting plate, the first mounting plate is fixedly installed in the first working cavity inside the working housing, and a second working cavity is also arranged inside the working housing, and an annular groove is communicated between the first working cavity and the second working cavity.

Preferably, the speed-increasing and heat-dissipating mechanism includes a gear sleeve, the gear sleeve is rotatably disposed within the annular groove, and the gear sleeve is connected with a first gear ring in the first working cavity, and three planetary gears are meshed with the first gear ring in a circumferential direction; each of the planetary gears is fixedly connected with a respective one of a plurality of first connecting shafts, and each of the planetary gears is meshed with a respective one of a plurality of third gears, the third gear is meshed with a fourth gear, the fourth gear is fixedly connected with the motor shaft, the third gear is fixedly connected with a fan blade through a second connecting shaft, both of the first connecting shaft and the second connecting shaft are rotatably connected with a front end of the first working cavity, and the gear sleeve is fixedly connected with the first rotating shaft through a fixing plate in the second working cavity.

Preferably, a locking mechanism is arranged in the cavity in the rotating drum, and the locking mechanism includes a limit bevel gear, the plurality of second bevel gears are correspondingly meshed with the limit bevel gear in a circumferential direction, the limit bevel gear is fixedly connected with a sliding plate at one end of the sliding plate, and a plurality of connecting rods are evenly distributed in a circumferential direction of the sliding plate, and each of the connecting rods is fixedly connected with a respective arc-shaped block, the arc-shaped block is correspondingly matched with each of the fixed shafts, the sliding plate is slidably disposed within the cavity in the rotating drum, and the other end of the sliding plate is fixedly connected with a magnetic block, and the one end of the sliding plate is opposite to the other end of the sliding plate; the magnetic block is arranged corresponding to an electromagnetic block, the electromagnetic block is fixedly arranged in the cavity in the rotating drum, and a plurality of spring rods are fixedly arranged between the sliding plate and the cavity in the rotating drum.

Preferably, a sealing sleeve is rotatably arranged between each of the fixed shafts and the rotating drum.

Preferably, the first working cavity is communicated with a ventilation mechanism, and the ventilation mechanism includes an air inlet arranged at a side end of the working housing, a filter screen is obliquely arranged at the air inlet, and a rear end of the working housing is provided with an air outlet, and a hinge is rotatably arranged on the working housing at the air outlet, the hinge is fixedly connected with an air outlet plate, and the air inlet, the first working cavity and the air outlet are sequentially communicated.

The technical scheme of the disclosure will be further described in detail through the attached drawings and embodiments.

Compared with the prior art, the disclosure has the following beneficial effects.

1. By setting of speed-increasing and heat-dissipating mechanism, the speed-increasing function is combined with the heat dissipation function, saving space and synchronously cooling the generator when the motor shaft is speed-increasing.

2. The motor drives the first bevel gear to rotate, the first bevel gear drives the second bevel gear to rotate, and the second bevel gear drives the fixed shaft to rotate, and the fixed shaft drives the blades to rotate around the fixed shaft, so that the windward angle of the blades is adjusted, so that the rotating speed of the motor shaft is kept at the target rotating speed, and the safe operation of the generator is ensured.

BRIEF DESCRIPTION OF THE DRAWINGS

The accompanying drawings are provided to provide a further understanding of the disclosure and constitute a part of the description. Together with the embodiments of the disclosure, they serve to explain the disclosure and do not constitute a limitation of the disclosure. In the attached drawings.

Figure 1:
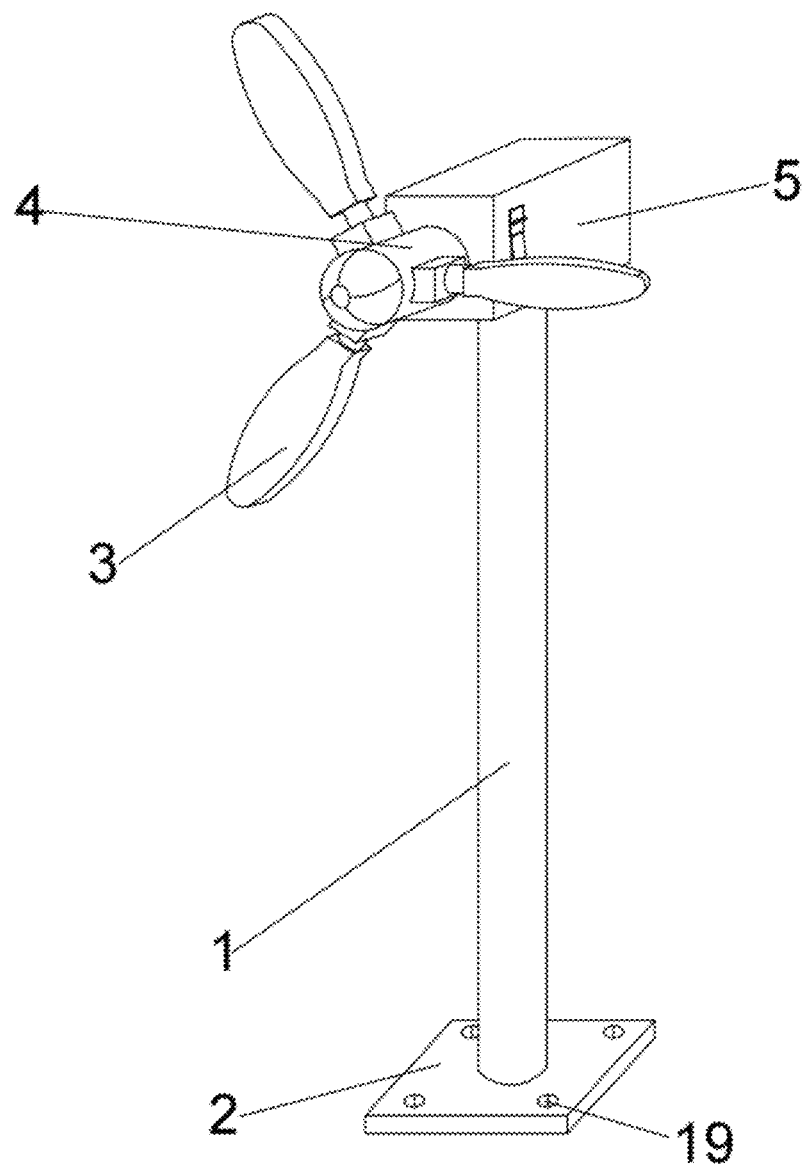
FIG. 1 is a schematic structural diagram according to the disclosure.

List of reference characters: 1 bracket; 2 bottom plate; 3 blade; 4 rotating drum; 5 working housing; 6 motor; 7 first bevel gear; 8 second bevel gear; 9 fixed shaft; 10 sealing sleeve; 11 electromagnetic block; 12 magnetic block; 13 sliding plate; 14 spring rod; 15 limit bevel gear; 16 connecting rod; 17 arc-shaped block; 18 cavity; 19 speed-increasing and heat-dissipating mechanism; 20 first rotating shaft; 21 generator; 22 air outlet plate; 23 first mounting plate; 24 gear sleeve; 25 hinge; 26 planetary gear; 27 fourth gear; 28 third gear; 29 fan blade; 34 air inlet; 35 filter screen; 40 fixed plate; and 69 first working cavity; 70 second working cavity; 71 annular groove; 72 first gear ring; 73 first connecting shaft; 74 second connecting shaft; 75 motor shaft, and 76 surface.

DETAILED DESCRIPTION OF THE EMBODIMENTS

Preferred embodiments of the disclosure will be described below with reference to the accompanying drawings, and it should be understood that the preferred embodiments described here are only used to illustrate and explain the disclosure, and are not used to limit the disclosure.

In addition, in the disclosure, descriptions such as "first" and "second" are only used for description purposes, and do not specifically refer to the order or sequence, nor are they used to limit the disclosure. They are only used to distinguish components or operations described in the same technical terms, and cannot be understood as indicating or implying their relative importance or implicitly indicating the number of indicated technical features. Therefore, the features defined as "first" and "second" can explicitly or implicitly include at least one of these features. In addition, the technical solutions and technical features of each embodiment can be combined with each other, but they must be based on the realization of ordinary skilled in the field. When the combination of technical solutions is contradictory or impossible, it should be considered that the combination of technical solutions does not exist and is not within the scope of protection required by the disclosure.

The disclosure provides the following embodiments. In the present disclosure, the term "bracket' is defined as an upright tower support; the term "speed-increasing and heat-dissipating mechanism" is defined as a mechanism used to increase the speed of a motor shaft and dissipate heat from a generator; and the term "bottom plate" is defined as a component or structure that provides support and an installation base for a multi-blade wind turbine.

Embodiment 1

The embodiment of the disclosure provides a multi-blade wind turbine, as shown in FIGS. 1-4, which includes a bottom plate 2, a bracket 1 is installed at an upper end of the bottom plate 2, a working housing 5 is installed at an upper end of the bracket 1, and a generator 21 is arranged in a first working cavity 69 inside the working housing 5, and a motor shaft 75 of the generator 21 is connected with a first rotating shaft 20 through a speed-increasing and heat-dissipating mechanism 19; the first rotating shaft 20 penetrates a front end of the working housing 5 and is fixedly connected with a rotating drum 4, and the rotating drum 4 is configured for rotation relative to the working housing 5, and a cavity 18 is arranged in the rotating drum 4, and a motor 6 is fixedly arranged in the cavity 18 in the rotating drum 4, and the motor 6 is fixedly connected with a first bevel gear 7; the first bevel gear 7 is evenly meshed with a plurality of second bevel gears 8 in a circumferential direction, the number of the plurality of second bevel gears 28 is three; and the plurality of second bevel gears 8 are fixedly connected with a plurality of fixed shafts 9 in one-to-one correspondence, and each of the fixed shafts 9 penetrates a side wall of the rotating drum 4 at a different position on the side wall and is fixedly connected with a respective blade 3.

Figure 2A:
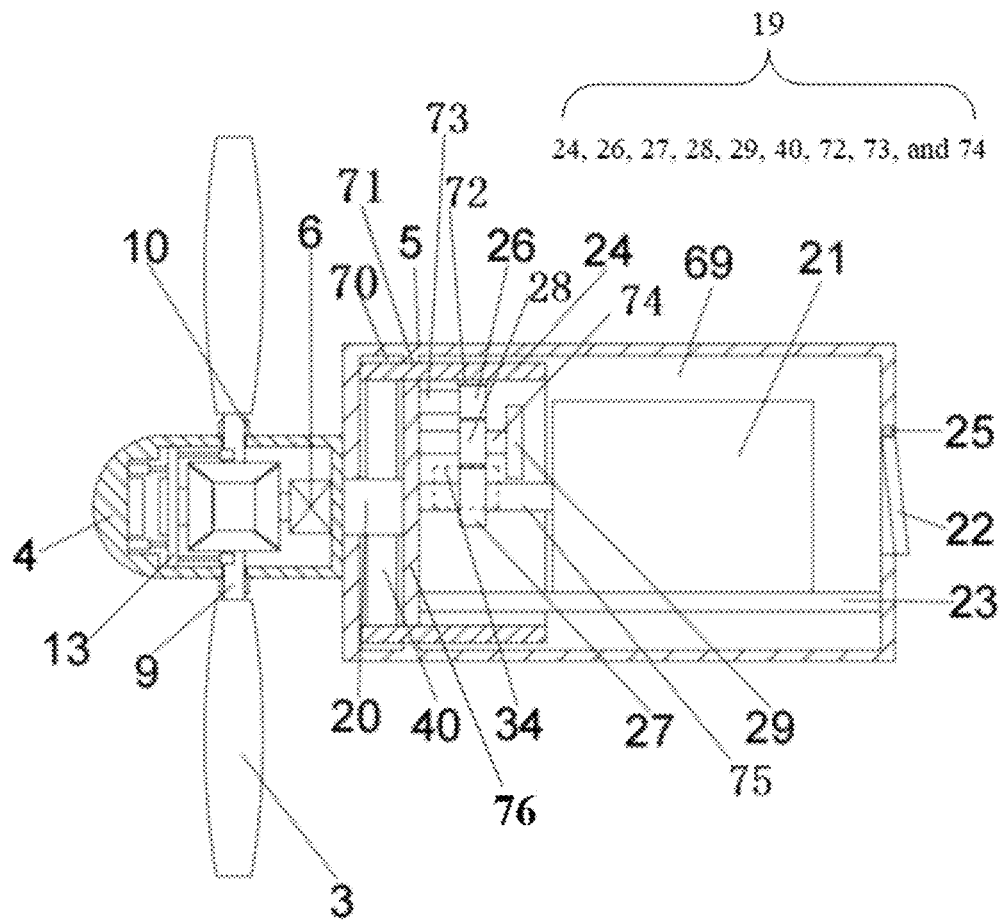
FIG. 2A is an internal schematic diagram of the working housing and the rotating drum according to the disclosure.
Figure 2B:
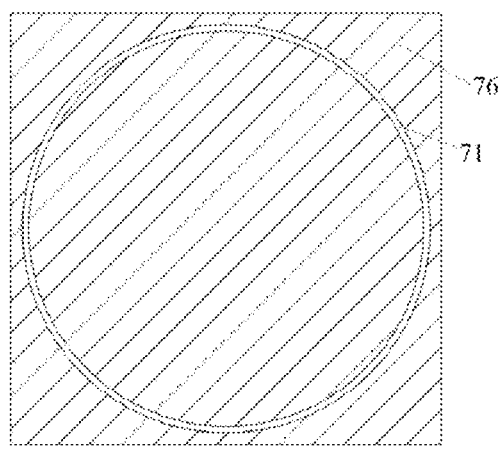
FIG. 2B is a schematic diagram of an annular groove according to the disclosure.

The generator 21 is fixedly connected with a first mounting plate 23, the first mounting plate 23 is fixedly installed in the first working cavity 69 inside the working housing 5, and a second working cavity 70 is also arranged inside the working housing 5, and an annular groove 71 is communicated between the first working cavity 69 and the second working cavity 70, where the annular groove 71 is defines as an annular opening provided in a surface 76 that divides and separates the first working cavity and the second working cavity, as shown in FIG. 2B.

The speed-increasing and heat-dissipating mechanism 19 includes a gear sleeve 24, the gear sleeve 24 is rotatably disclosed within the annular groove 71, and the gear sleeve 24 is connected with a first gear ring 72 in the first working cavity 69, and three planetary gears 26 are meshed with the first gear ring 72 in a circumferential direction; each of the planetary gears 26 is fixedly connected with a respective one of a plurality of first connecting shafts 73, and each of the planetary gears 26 is meshed with a respective one of a plurality of third gears 28, the third gear 28 is meshed with a fourth gear 27, the fourth gear 27 is fixedly connected with the motor shaft 75, the third gear 28 is fixedly connected with a fan blade 29 through a second connecting shaft 74, both of the first connecting shaft 73 and the second connecting shaft 74 are rotatably connected with a front end of the first working cavity 69, and the gear sleeve 24 is fixedly connected with the first rotating shaft 20 through a fixing plate 40 in the second working cavity 70.

The technical scheme has the following beneficial effects.

When the wind drives the blades 3 to rotate, the blades 3 drive the rotating drum 4 to rotate, and the rotating drum 4 drives the first rotating shaft 20 to rotate. The first rotating shaft 20 drives the fixed plate 40 in the speed-increasing and heat-dissipating mechanism 19 to rotate, and the fixed plate 40 drives the gear sleeve 24 to rotate. The annular groove 71 plays a guiding role in the rotation of the gear sleeve 24, and the first gear ring 72 of the gear sleeve 24 drives the planetary gear 26 to rotate, and the planetary gear 26 drives the third gear 28 to rotate, the third gear 28 drives the fourth gear 27 to rotate, and the fourth gear 27 drives the motor shaft 75 of the generator 21 to rotate, so that the generator 21 starts to work. The first gear ring 72, the planetary gear 26, the third gear 28 and the fourth gear 27 in the gear sleeve 24 form a speed-increasing assembly, which can increase the rotation speed of the motor shaft 75. When the third gear 28 rotates, it also drives the fan blades 29 to rotate, which are distributed on the upper side and the left and right sides of the generator 21. When the fan blades 29 rotate, the air velocity on the surface of the generator 21 can be increased, and the generator 21 can be cooled. The arrangement of the speed-increasing and heat-dissipating mechanism 19 combines the speed-increasing function with the heat dissipation function, saving space, and synchronously cooling the generator 21 when the motor shaft 75 is accelerated, thus solving the technical problem that in the process of wind power generation, the generator will generate a lot of heat, and if the generator is not cooled, the normal operation of the generator will be affected or even the service life of the generator will be affected.

The motor 6 drives the first bevel gear 7 to rotate, the first bevel gear 7 drives the second bevel gear 8 to rotate, and the second bevel gear 8 drives the fixed shaft 9 to rotate, and the fixed shaft 9 drives the blade 3 to rotate around the fixed shaft 9, so that the windward angle of the blade 3 is adjusted, thereby changing the rotating speed of the blade 3 and the connected rotating drum 4, and keeping the rotating speed of the motor shaft 75 at the target rotating speed, the target rotating speed of the motor shaft 75 is the rotating speed of the motor shaft 75 required under the rated power of the generator 21. When the wind power level is too high and the rotation speed of the motor shaft 75 of the generator 21 is too high, the motor 6 is controlled to work, and the rotation speed of the motor shaft 75 is reduced by changing the windward angle of the blades 3, which plays a protective role for the generator 21 and solves the technical problem that when the wind power level is too high, the rotation speed of the motor shaft 75 of the generator will be too fast, which will seriously affect the service life of the generator.

Embodiment 2

Figure 3:
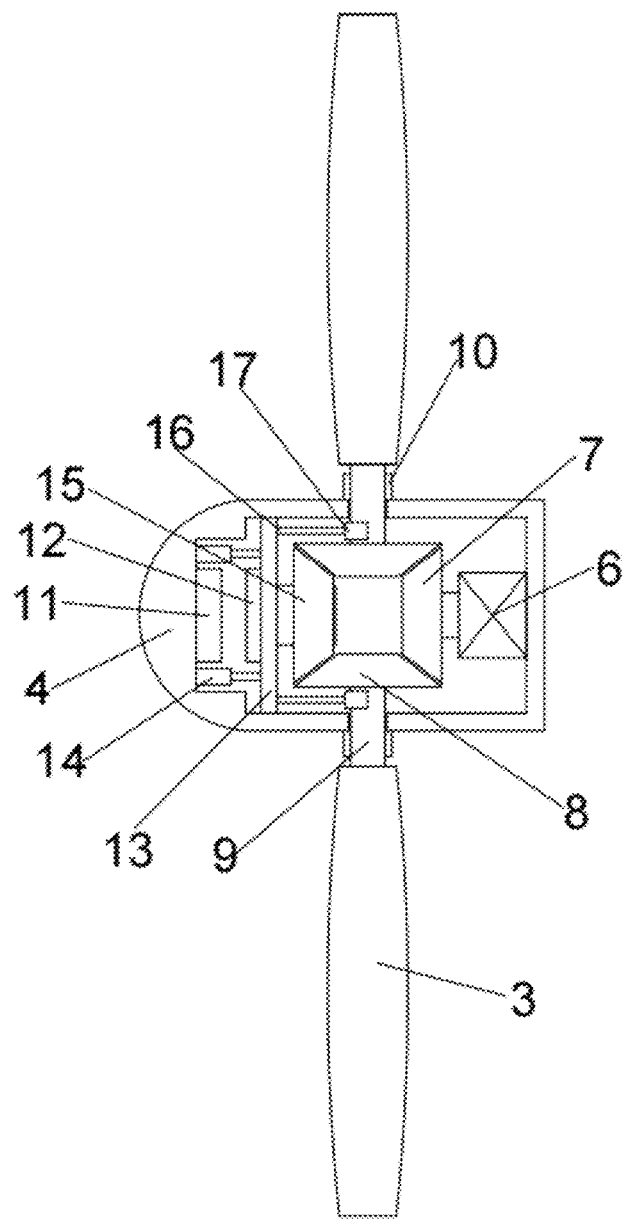
FIG. 3 is a schematic diagram of the internal structure of the rotating drum according to the disclosure.
Figure 4:
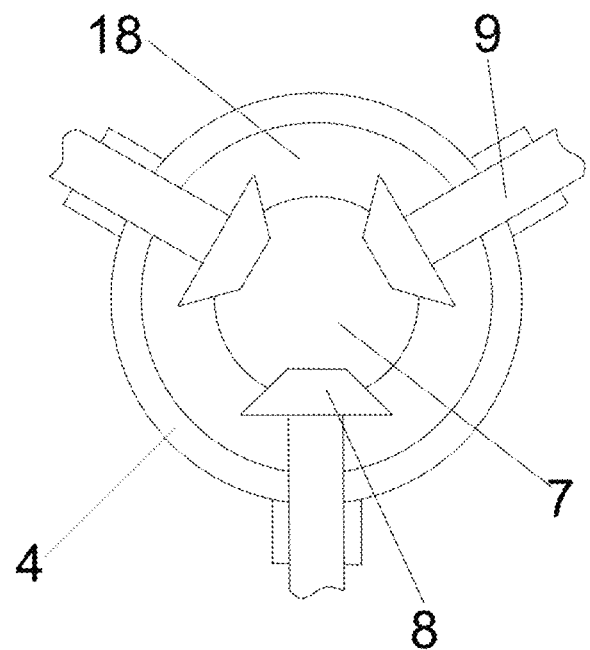
FIG. 4 is a schematic diagram of the internal side structure of the rotating drum according to the disclosure.
Figure 5:
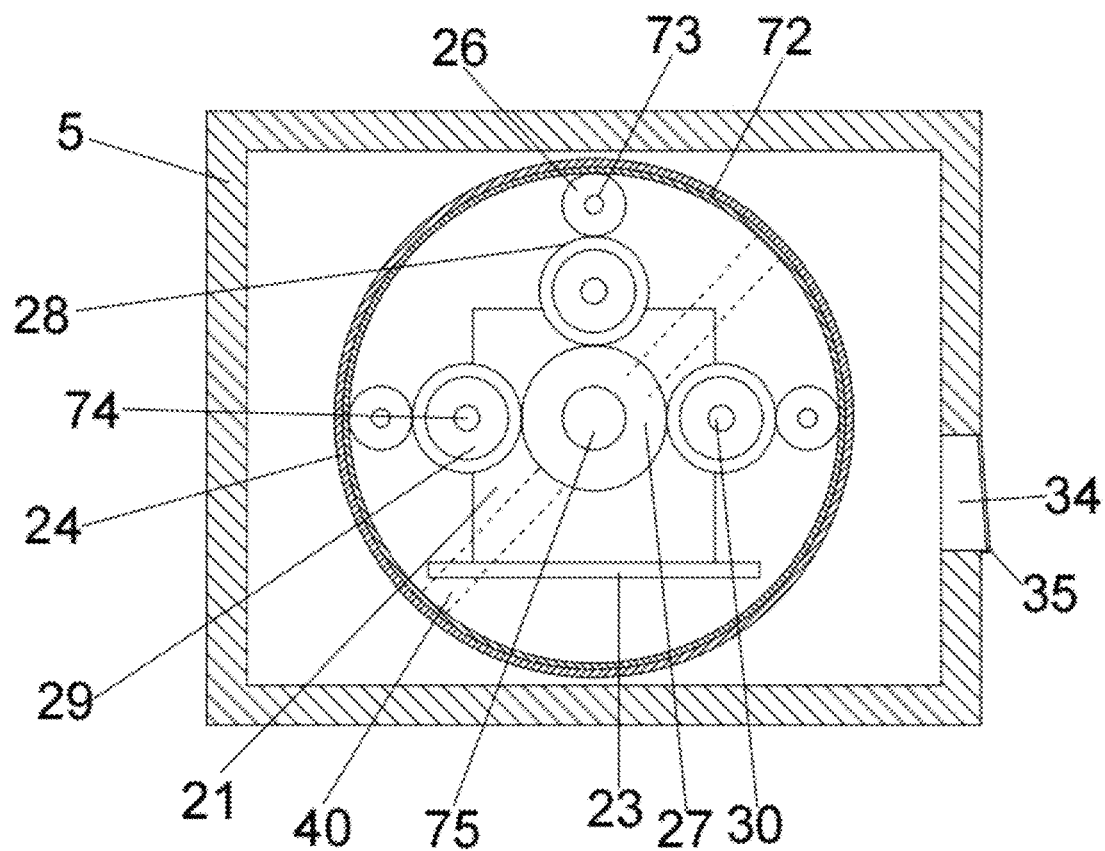
FIG. 5 is a schematic diagram of the internal side structure of the working housing according to the disclosure.

On the basis of Embodiment 1, as shown in FIGS. 1-3, a locking mechanism is arranged in the cavity 18 in the rotating drum 4, and the locking mechanism includes a limit bevel gear 15, the plurality of second bevel gears 8 are correspondingly meshed with the limit bevel gear 15 in a circumferential direction, the limit bevel gear 15 is fixedly connected with a sliding plate 13 at one end of the sliding plate 13, and a plurality of connecting rods 16 are evenly distributed in a circumferential direction of the sliding plate 13, and each of the connecting rods 16 is fixedly connected with a respective arc-shaped block 17, the arc-shaped block 17 is correspondingly matched with each of the fixed shafts 9, the sliding plate 13 is slidably disposed within the cavity 18 in the rotating drum 4, and the other end of the sliding plate 13 is fixedly connected with a magnetic block 12, and the one end of the sliding plate is opposite to the other end of the sliding plate; the magnetic block 12 is arranged corresponding to an electromagnetic block 11, the electromagnetic block 11 is fixedly arranged in the cavity 18 in the rotating drum 4, and a plurality of spring rods 14 are fixedly arranged between the sliding plate 13 and the cavity 18 in the rotating drum 4.

A sealing sleeve 10 is rotatably arranged between each of the fixed shafts 9 and the rotating drum 4.

The technical scheme has the following beneficial effects.

The limit bevel gear 15 is arranged at the front side of the cavity 18, and the first bevel gear 7 is arranged at the back side of the cavity 18. When the windward angle of the blade 3 is kept fixed, the limit bevel gear 15 and the second bevel gear 8 are kept in mesh to limit the second bevel gear 8, so that the blade 3 and the rotating drum 4 are kept fixed. The limit bevel gear 15 improves the limit effect on the second bevel gear 8, and the rough arc-shaped block 17 is matched with the fixed shaft 9. The rough arc-shaped block 17 is a semicircle block, and a rough layer is arranged in the semicircle cavity of the semicircle block, so that the friction between the rough arc-shaped block 17 and the fixed shaft 9 is increased, the limiting effect between the fixed shaft 9 and the rough arc-shaped block 17 is improved, and the stabilizing effect between the blade 3 and the rotating drum 4 is further improved. If the motor 6 works, the electromagnetic block 11 is energized first, and the adsorption force between the electromagnetic block 11 and the magnetic block 12 drives the sliding plate 13 to slide. The sliding plate 13 drives the limit bevel gear 15 to disengage from the second bevel gear 8, the rough arc-shaped block 17 to disengage from the fixed shaft 9, and the spring rod is compressed. At this time, when the first bevel gear 17 rotates, it can drive the second bevel gear 8 to rotate, which is used to adjust the windward angle of the blade 3. After the windward angle of the blade 3 is adjusted and the motor 6 stops working, the electromagnetic block 11 is powered off, and the bevel gear 15 and the rough arc-shaped block 17 are limited to their original positions under the elastic action of the spring rod 14, so that the second bevel gear 8 and the fixed shaft 9 are limited again, and the blade 3 is locked by the setting of the locking mechanism. The relative rotation between the blade 3 and the rotating drum 4 caused by excessive wind force is avoided, and the second bevel gear 8 is also prevented from being limited only by the motor 6 and the first bevel gear 7, which is easy to damage the motor 6 and the first bevel gear 7. The arrangement of the sealing sleeve 10 prevents external dust and impurities from entering the cavity 18 and affecting the service life of parts in the cavity 18.

Embodiment 3

On the basis of Embodiment 1, as shown in FIGS. 1-5, the first working cavity 69 is communicated with a ventilation mechanism, and the ventilation mechanism includes an air inlet 34 arranged at a side end of the working housing 5, a filter screen 35 is obliquely arranged at the air inlet 34, and a rear end of the working housing 5 is provided with an air outlet, and a hinge 25 is rotatably arranged on the working housing at the air outlet, the hinge 25 is fixedly connected with an air outlet plate 22, and the air inlet 34, the first working cavity 69 and the air outlet are sequentially communicated.

The technical scheme has the following beneficial effects.

By arranging the air inlet 34 and the air outlet, the air in the first working cavity 69 flows circularly, which is convenient for cooling the generator 21; by arranging the filter screen 35, the service life of parts in the first working cavity 69 is prevented from being influenced by the dust and impurities from the outside; and the air outlet plate 22 is arranged at the air outlet, which is obliquely arranged, and can rotate only when the air in the first working cavity 69 is exhausted to the outside. However, the outside air cannot enter the first working cavity 69 through the air outlet, and the arrangement of the air outlet plate 22 plays a guiding role in the air flow direction, so that the air can circulate along the air inlet 34, the first working cavity 69 and the air outlet in sequence.

Obviously, those skilled in the art can make various modifications and variations to the disclosure without departing from the spirit and scope of the disclosure. Thus, if these modifications and variations of the disclosure are within the scope of the claims of the disclosure and their equivalents, it is intend that the disclosure also include these modifications and variation.

What is claimed is:

1. A multi-blade wind turbine, comprising a bottom plate, wherein a bracket is installed at an upper end of the bottom plate, a working housing is installed at an upper end of the bracket, and a generator is arranged in a first working cavity inside the working housing, and a motor shaft of the generator is connected with a first rotating shaft through a speed-increasing and heat-dissipating mechanism; the first rotating shaft penetrates a front end of the working housing and is fixedly connected with a rotating drum, and the rotating drum is configured for rotation relative to the working housing, and a cavity is arranged in the rotating drum, and a motor is fixedly arranged in the cavity in the rotating drum, and the motor is fixedly connected with a first bevel gear; the first bevel gear is evenly meshed with a plurality of second bevel gears in a circumferential direction, and the plurality of second bevel gears are fixedly connected with a plurality of fixed shafts in one-to-one correspondence, and each of the fixed shafts penetrates a side wall of the rotating drum at a different position on the side wall and is fixedly connected with a respective blade;

the generator is fixedly connected with a first mounting plate, the first mounting plate is fixedly installed in the first working cavity inside the working housing, and a second working cavity is also arranged inside the working housing, and an annular groove is communicated between the first working cavity and the second working cavity;

the speed-increasing and heat-dissipating mechanism comprises a gear sleeve, the gear sleeve is rotatably disposed within the annular groove, and the gear sleeve is connected with a first gear ring in the first working cavity, and three planetary gears are meshed with the first gear ring in a circumferential direction; each of the planetary gears is fixedly connected with a respective one of a plurality of first connecting shafts, and each of the planetary gears is meshed with a respective one of a plurality of third gears, the third gear is meshed with a fourth gear, the fourth gear is fixedly connected with the motor shaft, the third gear is fixedly connected with a fan blade through a second connecting shaft, both of the first connecting shaft and the second connecting shaft are rotatably connected with a front end of the first working cavity, and the gear sleeve is fixedly connected with the first rotating shaft through a fixing plate in the second working cavity;

a locking mechanism is arranged in the cavity in the rotating drum, and the locking mechanism comprises a limit bevel gear, the plurality of second bevel gears are correspondingly meshed with the limit bevel gear in a circumferential direction, the limit bevel gear is fixedly connected with a sliding plate at one end of the sliding plate, and a plurality of connecting rods are evenly distributed in a circumferential direction of the sliding plate, and each of the connecting rods is fixedly connected with a respective arc-shaped block with a rough layer arranged in a semicircle cavity of arc-shaped block, the arc-shaped block is correspondingly matched with each of the fixed shafts, the sliding plate is slidably disposed within the cavity in the rotating drum, and the other end of the sliding plate is fixedly connected with a magnetic block, and the one end of the sliding plate is opposite to the other end of the sliding plate; the magnetic block is arranged corresponding to an electromagnetic block, the electromagnetic block is fixedly arranged in the cavity in the rotating drum, and a plurality of spring rod are fixedly arranged between the sliding plate and the cavity in the rotating drum.

2. The multi-blade wind turbine according to claim 1, wherein a sealing sleeve is rotatably arranged between each of the fixed shafts and the rotating drum.

3. The multi-blade wind turbine according to claim 1, wherein the first working cavity is communicated with a ventilation mechanism, and the ventilation mechanism comprises an air inlet arranged at a side end of the working housing, a filter screen is obliquely arranged at the air inlet, and a rear end of the working housing is provided with an air outlet, and a hinge is rotatably arranged on the working housing at the air outlet, the hinge is fixedly connected with an air outlet plate, and the air inlet, the first working cavity and the air outlet are sequentially communicated.

* * * * *